United States Patent [19]

Seyam

[11] Patent Number: 5,492,710
[45] Date of Patent: Feb. 20, 1996

[54] FAT FREE OR LOW FAT COOKIE PRODUCTION

[75] Inventor: Abdelmonem A. Seyam, Parsippany, N.J.

[73] Assignee: Nabisco, Inc., Parsippany, N.J.

[21] Appl. No.: 199,412

[22] Filed: Feb. 22, 1994

[51] Int. Cl.⁶ .................................................. A21D 8/00
[52] U.S. Cl. .......................................... 426/550; 426/549
[58] Field of Search ................................... 426/549, 550

[56] References Cited

U.S. PATENT DOCUMENTS

| | | | |
|---|---|---|---|
| 3,752,675 | 8/1973 | Tsen | 426/549 |
| 4,109,025 | 8/1978 | Lauck . | |
| 4,351,852 | 9/1982 | Rule et al. . | |
| 4,396,635 | 8/1983 | Roudebush et al. . | |
| 4,424,237 | 1/1984 | Wittman, III . | |
| 4,451,491 | 5/1984 | Trop et al. . | |
| 4,455,321 | 6/1984 | Glabe | 426/549 |
| 4,481,222 | 11/1984 | Fan . | |
| 4,504,510 | 3/1985 | Aliberto | 426/553 |
| 4,562,080 | 12/1985 | Tenn . | |
| 4,618,498 | 10/1986 | Thulin . | |
| 4,624,856 | 11/1986 | Vanderveer et al. . | |
| 4,696,825 | 9/1987 | Leibfred . | |
| 4,717,577 | 1/1988 | Constance et al. . | |
| 4,762,723 | 8/1988 | Strong . | |
| 4,774,095 | 9/1988 | Kleinschmidt et al. . | |
| 4,818,553 | 4/1989 | Holscher et al. . | |
| 4,834,996 | 5/1989 | Fazzolare et al. . | |
| 4,840,803 | 6/1989 | Polizzano | 426/549 |
| 4,873,093 | 10/1989 | Fazzolare | 426/550 |
| 4,952,413 | 8/1990 | LaBarge et al. . | |
| 4,957,599 | 9/1990 | Chou | 426/615 |
| 4,971,823 | 11/1990 | Fahlen . | |
| 5,080,921 | 1/1992 | Reimer . | |
| 5,082,684 | 1/1992 | Fung . | |
| 5,094,872 | 3/1992 | Furcsik et al. . | |
| 5,104,673 | 4/1992 | Fazzolare et al. . | |
| 5,106,644 | 4/1992 | El-Nokaly . | |
| 5,108,764 | 4/1992 | Craig et al. . | |
| 5,123,830 | 6/1992 | Papalexis . | |
| 5,133,984 | 7/1992 | Murphy et al. . | |
| 5,154,942 | 10/1992 | Hirschey et al. . | |
| 5,190,776 | 3/1993 | Baumann . | |
| 5,190,786 | 3/1993 | Anderson et al. . | |
| 5,194,282 | 3/1993 | Grossman et al. . | |
| 5,202,146 | 4/1993 | Singer et al. . | |
| 5,208,060 | 5/1993 | Gautchier et al. . | |
| 5,275,830 | 1/1994 | Smith . | |
| 5,275,837 | 1/1994 | Eastman . | |
| 5,292,540 | 3/1994 | Laufer . | |
| 5,292,542 | 3/1994 | Beck et al. . | |
| 5,340,598 | 8/1994 | Hay | 426/467 |
| 5,344,663 | 9/1994 | Jewell | 426/549 |

FOREIGN PATENT DOCUMENTS

WO91/18514 12/1991 WIPO .

OTHER PUBLICATIONS

De Gouy 1944 The Bread Tray Greenberg Publisher New York pp. 46–47, 82–83, 170–171, 276–277.

Atwell, et al., "The Terminology and Methodology Associated with Basic Starch Phenomenon," *Cereal Foods World*, vol. 33, No. 3, pp. 306–311, Mar. 1988.

Thayer, "Food Additives", Jun. 15, 1992, C&EN, pp. 26–44.

Sugarman, "Learning the New Label Lingo", Washington Post Health/Feb. 18, 1992, p. 16.

Deveny, "Man Walked on the Moon but Man Can't Make Enough Devil's Food Cookie Cakes", Wall Street Journal, Sep. 28, 1993, pp. B1 and B9.

*Primary Examiner*—Carolyn Paden

[57] ABSTRACT

The present invention provides a method for reducing rubberiness in the production of shelf-stable fat free or low-fat cookies caused by increased gluten functionality resulting from the elimination of shortening or fat in wheat-based cookies. At least about 50% by weight of the wheat flour is replaced with a flour mix comprising at least about 30% by weight white rye flour, at least about 30% by weight corn flour, and at least about 10% by weight rice flour. The particle size distribution of the flour mix is preferably about 55% by weight to about 65% by weight passes through a 60 mesh screen and none remains on a 30 mesh screen. The flour mix of the present invention may be used to produce shelf stable no fat, low fat, or reduced fat soft cookies, crisp cookies and other baked goods.

17 Claims, No Drawings

FAT FREE OR LOW FAT COOKIE PRODUCTION

FIELD OF THE INVENTION

The present invention relates to the production of cookies with reduced, low- or no- added fat. The invention also relates to dough compositions and flour compositions for producing the cookies.

BACKGROUND OF THE INVENTION

Shortening or fat is included in cookie formulations to control texture of the baked good, to facilitate machinability of the dough, to provide flavor and to serve as a carrier for flavoring ingredients, and to impart a lubricous mouthfeel to the baked good. Hydrophilic ingredients, such as starches and sugars, in a cookie dough compete for water during dough preparation, baking, and during storage. Dough machinability, oven spread, cookie texture, mouthfeet, and shelf stability are affected by where and when the water interacts with the hydrophilic ingredients. The shortening or fat, being hydrophobic, may substantially affect which cookie ingredients interact with the water.

For example, a cookie crumb-like structure is obtained by avoiding substantial starch gelatinization. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in property such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomenon," *Cereal Food World,* Vol. 33, No. 3, Pgs. 306–311 (March 1988). Thus, coating of starch containing flour particles by shortening or fat may prevent substantial penetration of moisture into the starch granules so as to avoid substantial gelatinization.

It has been found that the elimination of fat in wheat based cookies results in a rubbery textured product even when water-binding fat substitutes, such as gums, and emulsifiers are included in the formulation. The rubbery texture is particularly noticeable in high moisture content cookies. Also, to improve machinability of doughs having a low fat content, increased amounts of water are used. Water is also generally desirably retained in the baked good to compensate for the reduced lubricous mouthfeel caused by fat reduction. It is believed that the increased rubberiness is caused by an increase in the functionality of the wheat gluten. It is believed that more water is available to penetrate the flour particles to react with the gluten to result in a rubbery or elastic texture upon baking. Removal of the fat or shortening eliminates a hydrophobic coating of the flour particles thereby permitting moisture penetration into the flour particles for reaction with the gluten. In addition, increasing the moisture content of the dough or batter to improve machinability also makes more water available for reaction with the gluten. While the addition of gums and emulsifiers may be used to tie up or hold water to make it less available for reaction with the gluten, it is believed that they do not provide the moisture repelling capabilities or coating properties of a fat or shortening.

The present invention provides low-fat or no-fat cookie products which exhibit a soft, moist, chewy, non-rubbery texture which is shelf stable for prolonged periods of time.

SUMMARY OF THE INVENTION

The present invention provides low-fat or fat-free cookies which have a soft, nonrubbery texture for extended periods of time of at least two months, preferably at least four months when packaged in proper, air tight packaging. Stickiness in cookie doughs and rubberiness in cookies resulting from increased functionality of gluten caused by the elimination of shortening or fat is reduced by use of a weak protein flour mix which replaces at least a substantial portion of the wheat flour used in cookie production. The flours used to at least partially substantially replace wheat flour have weak proteins which do not form an elastic gluten structure, have relatively high water retention properties, have relatively high insoluble fiber and relatively low soluble fiber contents, and need not be made from the whole grain. In embodiments of the present invention, the weak protein flour mix may comprise at least about 30% by weight white rye flour, at least about 30% by weight corn flour, and at least about 10% by weight rice flour, said percentages adding up to 100%. The weak protein flour mix may be used in combination with wheat flour or other glutenous flours provided the wheat or glutenous flour is used in amounts which do not impart a rubbery texture to the final product. The flour mix of the present invention may comprise at least about 50% by weight of the total amount of flour used to produce the cookies of the present invention. To avoid a course, gritty mouthfeel and to increase the hydration properties of the flour, the particle size of the flour is preferably finely granulated. The flour mix of the present invention preferably has a particle size distribution where 60%±5% by weight passes through a 60 mesh screen and none is retained on a 30 mesh screen. The cookies of the present invention may include emulsifiers and gums for increasing water binding and for promoting a lubricous mouthfeel. Sorbitol is preferably included in the compositions of the present invention for controlling excessive spread and sweetness and for providing a long lasting soft texture. The soft cookies of the present invention may have a shelf stable water content of at least about 16% by weight but generally less than about 26% by weight, preferably about 18% by weight to about 23% by weight, based upon the total weight of the final product. The flour mix of the present invention may also be used to produce shelf stable no fat or low fat crisp cookies and other baked goods.

DETAILED DESCRIPTION OF THE INVENTION

In the present invention, increased dough stickiness and a rubbery baked product texture resulting from the elimination of shortening or fat in cookies is avoided by replacement of at least a substantial portion of the wheat flour with a weak protein flour mix. In reduced fat baked goods where the amount of water is increased to improve machinability of the composition, more water becomes available for interacting with the gluten in wheat flour. In addition, it is easier for the water to penetrate into the flour particles for reaction with the gluten in the absence of a hydrophobic fat or oil coating on the flour particles. Greater availability of the water may also be caused by reduced formation of water and oil emulsions. Reduction of the gluten functionality with the flour mix of the present invention provides a machineable dough, batter, or dough-like mixture for the production of low-fat or fat-free cookies or baked goods which do not possess a rubbery texture. In embodiments of the present invention, fat free or low fat products exhibit a soft, moist, cookie crumb-like non-rubbery texture for extended periods of time of at least about two months, preferably at least about four months.

As used herein, a reduced fat food product is a product having its fat content reduced by at least 25% by weight from the standard or conventional product. A low fat product has a fat content of less than or equal to about two grams of fat per 30 gram serving. A no-fat or zero-fat product has a fat content of less than or equal to about 0.5 grams of fat per 30 gram serving or less than or equal to about 1.67% fat, based upon the total weight of the final product.

Shortening or fat which may be used in producing reduced fat or low fat cookies in accordance with the present invention may be any edible fat or oil or mixture thereof suitable for baking applications and may include conventional food-grade emulsifiers. Vegetable oils, lard, marine oils, and mixtures thereof which are fractionated, partially hydrogenated, and/or interesterified are exemplary of the shortenings or fats which may be used in the present invention.

The flour mix used in the fat-free and low-fat products of the present invention comprises flours which may have from about 5% by weight to about 15% by weight of weak proteins which do not form an elastic gas-holding gluten structure when mixed. The soluble fiber content may range from about 0 to about 3% by weight. The insoluble fiber content may range up to about 15% by weight. The flour mix may comprise at least about 30% by weight of white rye flour, at least 30% by weight of corn flour, and at least 10% by weight of rice flour, said percentages adding up to 100% by weight. In preferred embodiments of the present invention, the flour mix used to replace wheat flour may comprise about 35% by weight to about 50% by weight white rye flour, about 35% by weight to about 50% by weight corn flour, and about 15% by weight to about 25% by weight rice flour, said percentages adding up to 100%.

The flour mix of the present invention is preferably finely granulated for a smooth mouthfeel and soft, tender texture. The particle size distribution of the flour mix is preferably such that 60%± 5% by weight passes through a 60 mesh screen while the percentage remaining on a 30 U.S. mesh screen is zero. Flour blends which are too course would provide a gritty mouthfeel and would require prolonged periods of time to hydrate. The flour blends of the present invention may be prepared by separately grinding the white rye flour, corn flour, and rice flour then mixing the ground flours together to form a substantially homogeneous blend. The blend may then be sifted to obtain the desired fine granulation. The flours used to produce the flour blend of the present invention are preferably not full or whole grain flours so as to provide a more smooth mouthfeel in the baked good.

Wheat flour, bleached or unbleached, or other glutenous flours such as graham flour may be used in combination with the weak protein flour mix of the present invention in amounts which do not result in a rubbery textured product. The weak protein flour mix generally comprises at least about 50% by weight of the total amount of flour used to produce the cookies of the present invention. The presence of wheat flour or other flours which form an elastic gluten structure, is desirable for dough machinability, and gas retention for leavening. In addition, the wheat flour masks the flavors of the other flours such as corn flour. In preferred embodiments, the wheat flour may be used in amounts of about 20% by weight to about 45% by weight, based upon the total amount of flour used in the cookie dough formulation. A preferred wheat flour is cake flour or other low protein content wheat flours.

The total amount of all flours used in the compositions of the present invention ranges, for example, from about 25% by weight to about 70% by weight, preferably from about 30% by weight to about 50% by weight. Unless otherwise indicated, all weight percentages are based upon the total weight of all ingredients forming the doughs, batters, dough-like mixtures or formulations of the present invention except for inclusions such as flavor chips, nuts, raisins, fruit pieces, and the like. Thus, "the weight of the dough, batter, or dough-like mixture" does not include the weight of inclusions.

Reducing the fat content of baked goods also tends to make them taste sweeter. It is believed that the shortening or fat masks the sweetness of sugars, such as sucrose by coating the sugar crystals. In addition, increasing amounts of sugars may be used as a bulking agent and texturizing agent to compensate for the reduction in fat content. In the present invention, sorbitol is preferably used to reduce excessive sweetness, provide bulk, eliminate excessive spread, and to promote a soft texture in the baked good. It is believed that the sorbitol binds water and may also coat the flour particles to prevent excessive starch gelatinization during baking and thereby promote attainment of a softer textured crumb-like product.

In addition to the sorbitol, other humectants, or aqueous solutions of humectants which are not sugars or possess a low degree of sweetness relative to sucrose may also be employed in the cookie doughs of the present invention. For example, glycerol, sugar alcohols such as mannitol, maltitol, and xylitol, and other polyols, may be used as humectants alone or in combination with sorbitol. Additional examples of humectant polyols (i.e. polyhydric alcohols) include humectant glycols, for example propylene glycol and hydrogenated glucose syrups. Other humectants include sugar esters, dextrins, hydrogenated starch hydrolysates, and other starch hydrolysis products.

Other process compatible ingredients which can be used to modify the texture of the products produced in the present invention include sugars such as sucrose, fructose, lactose, dextrose, galactose, maltodextrins, corn syrup solids, hydrogenated starch hydrolysates, protein hydrolysates, mixtures thereof, and the like. Reducing sugars, such as fructose, maltose, lactose, and dextrose or mixtures of reducing sugars may be used to promote browning. Fructose is the preferred reducing sugar, because of its ready availability and its generally more enhanced browning and flavor development effects. Exemplary sources of fructose include invert syrup, corn syrup, high fructose corn syrup, molasses, brown sugar, maple syrup, mixtures thereof, and the like.

The texturizing ingredient, such as sugar may be admixed with the other ingredients in either solid or crystalline form, such as crystalline or granulated sucrose, granulated brown sugar, or crystalline fructose, or in liquid form, such as sucrose syrup or high fructose corn syrup. Sucrose alone or with other sugars is preferred in the present invention. The sucrose content may, for example, be at least about 80% by weight, based upon the total sugar solids content of the dough-like mixture. The balance of the sugar solids may comprise fructose, dextrose, lactose, or mixtures thereof, for example. Sugar granulations which may be used range, for example, from about 4X to about 12X.

In the doughs or batters of the present invention, on the basis of 100 pounds of the total amount of flour component in the dough, the humectant plus any sucrose or other sweetener employed (e.g. artificial sweeteners) in the formulation may be present in amounts ranging from about 50 to about 175 pounds depending on the degree of sweetness and humectant properties desired in the baked product. In preferred embodiments of the present invention, sorbitol may be used in amounts of about 25% by weight to about 55% by weight of the total amount of humectants plus any sucrose or other sweetener employed in the dough or batter.

In embodiments of the present invention, the total sugar solids content, or the texturizing ingredient content, of the doughs, batters, or dough-like mixtures of the present invention is, for example, at least about 10% by weight, and may, for example, go up to about 50% by weight, based upon the weight of the dough, batter, or dough-like mixture (exclusive off inclusions). It preferably ranges from about 20% by weight to about 45% by weight, based upon the weight of the dough, batter or dough-like mixture.

To promote a tender, non-cohesive cake-like soft textured crumb structure, it is desirable to include at least one emulsifier, polysaccharide hydrocolloid or gum, pregelatinized starch, or mixtures thereof in the cookie dough. These ingredients serve to bind water and promote a lubricous mouthfeel. Exemplary amounts are up to about 3% by weight of one or more emulsifiers, up to about 3% by weight of one or more gums, and up to about 12% by weight of one or more pregelatinized starches, each percent being based upon the total weight of the flour. Exemplary of pregelatinized starches are pregelatinized corn, wheat, and waxy maize starch. Typical emulsifiers which can be used include sorbitan monostearate, mono- and/or di-glycerides, polyoxyethylene sorbitan fatty acid esters, such as polysorbates (e.g., polyoxyethylene (20) sorbitan monostearate), and sodium stearoyl-2-lactate. Exemplary polysaccharide hydrocolloids which may be used are water-soluble, non-gelling gums such as xanthan gum, guar gum, and carboxymethylcellulose, and gums which form gels, such as alginates, pectins, carrageenans, and the like. Xanthan gum and sodium calcium alginate are preferred gums for use in the present invention. They are preferably used in amounts of about 0.1% by weight to about 1% by weight, based upon the weight of the dough, batter, or dough-like mixture.

The moisture contents of the doughs, batters, or dough-like mixtures of the present invention should be sufficient to provide the desired consistency to enable proper forming, machining, and cutting of the dough. The total moisture content of the compositions of the present invention will include any water included as a separately added ingredient, as well as the moisture provided by flour (which usually contains about 12% to about 14% by weight moisture), and the moisture content of other dough additives included in the formulation, such as sorbitol, high fructose corn syrup, invert syrups, or other liquid humectants.

Taking into account all sources of moisture in the dough, batter, or dough-like mixture including separately added water, the total moisture content of the dough, batter or dough-like mixture of the present invention is generally less than about 30% by weight, preferably less than about 25% by weight. The doughs, batters and dough-like compositions of the present invention generally have a water or moisture content of from about 18% by weight to about 23% by weight, based upon the weight of the dough-like composition.

In addition to the foregoing, the doughs, batters, or dough-like mixtures of the invention may include other additives conventionally employed in cookies. Such additives may include, for example, milk by-products, egg or egg by-products, cocoa, vanilla or other flavorings, as well as inclusions such as nuts, raisins, cherries, apples, apricots, peaches, or other fruits, citrus peel, coconut, flavored chips such as chocolate chips, butterscotch chips and caramel chips, and the like.

A source of protein which is suitable for inclusion in baked goods may be included in the compositions of the present invention to promote Maillard browning. The source of protein includes non-fat dry milk solids, dried or powdered eggs or egg whites, mixtures thereof, and the like. The amount of the proteinaceous source may, for example, range up to about 5% by weight, based upon the weight of the dough or batter.

The doughs, batters or dough-like cookie compositions of the present invention may contain up to about 5% by weight of a leavening system, based upon the weight of the dough-like mixture. The leavening agents may be used to adjust or control the degree of leavening and/or to control the pH of the cookie products. The inclusion of a leavening agent or other edible pH-adjusting agents may promote browning of the cookie mixture during baking. A desired pH for the cookies or the dough mass is from about 5 to about 9.5, preferably from about 7 to 8.5. Generally, the more alkaline the composition, the greater the degree of browning. However, the pH should be adjusted so as not to adversely affect taste of the final product.

Exemplary of chemical leavening agents or pH adjusting agents which may be used include alkaline materials and acidic materials such as sodium bicarbonate, ammonium bicarbonate, sodium acid pyrophosphate, sodium aluminum phosphate, tartaric acid, mixtures thereof, and the like.

Filled products may be produced in accordance with the present invention by coextruding the dough, batter, or dough-like mixture with filler materials. The coextrudate may be formed by the use of a concentric die or a tube inserted within the die orifice. Filled products may also be produced by transporting the dough-like mixture to a conventional enrobing or entrusting machine, such as produced by the Rheon Manufacturing Company for filling with a filler material. The filled dough pieces may have a weight ratio of the filler to the casing dough within the range from about 0.4–1.2:1.

Examples of fillers which may be used include chocolate, vanilla, butterscotch, fruit, peanut butter, and cheese-flavored fillings. The filling material may also be a separately produced dough-like mixture for the production of multi-flavored, multi-colored, or multi-textured cookie products. The preferred fillers for use in the present invention are low fat or fat free fillers. The fillers may be uncooked or cooked prior to coextrusion with the doughs of the present invention. Exemplary fillers which may be used are disclosed in U.S. Pat. No. 4,562,080.

The dough, batter, or dough-like mixture may be prepared by admixing the non-glutenous flours with the sugars, flavorings, gums, emulsifiers, and other texturizing ingredients, in a conventional upright dough mixer to obtain a substantially homogeneous mixture. Water, and wheat flour or other glutenous flours, may then be admixed with the substantially homogeneous mixture in a second mixing stage. Preservatives, and leavening agents may be added in the first or second mixing stage. The humectant is conveniently mixed in during the first mixing stage of the dough preparation. The humectant and at least part of any sucrose which is used may also be conveniently admixed with the ingredients in a third mixing stage to obtain a substantially homogeneous pourable batter or dough.

If flavor chips or fruit pieces are to be added to the cookie dough or batter, they are preferably added as the last ingredient to the dough with minimal mixing so as to avoid smearing of the flavor chips or pieces into the dough.

The doughs are preferably prepared at a temperature of less than about 85° F. They may be cooled using ice as a portion of the added water. Carbon dioxide snow may also be used to cool the dough or batter. Preferred dough or batter temperatures range from about 60° F. to about 77° F. Before being shaped or extruded, the dough, batter, or dough-like mixture is preferably permitted to lay for about 20 minutes to about 60 minutes to rehydrate and increase in consistency. Insufficient lay time may result in excessive spread and a dense, gummy texture. Cooling of the formulation and permitting it to lay also facilitates its transfer through a calendar press, extruder, coextruder or other dough forming device.

In the process of the present invention, a calender press, an extruder or continuous mixer may be utilized to form the dough or dough-like mixture into a continuous rope. Preferably the screws of the extruder will be co-rotating, i.e., rotate in the same direction. Co-rotating twin screw elements, generally provide thorough mixing and conveying of the components, with the elements of one screw continuously wiping the other screw. This is particularly advantageous when the composition being mixed has a relatively high viscosity.

Suitable extruders which may be used in the present invention include: (1) WENGER model series TX by Wenger of Sabetha, Kansas, (2) model series MPF by Baker Perkins, (3) model series BC by Creusot Loire of Paris, France, and preferably 4) model series ZSK or Continua by Werner and Pfleiderer. Single screw extruders including those with a horizontally oscillating screw during rotation (i.e. a Buss kneader by Buss of Pratteln, Switzerland) may also be used in accordance with the present invention.

A continuous mixer for use in the present invention comprises co-rotating screws and jacketed barrels with heating and/or cooling means. A continuous mixer is similar in construction to a cooker extruder except that for the same screw diameter, a continuous mixer has a greater free internal volume and thus operates to mix and convey ingredients at relatively lower pressures and shear than does an extruder to obtain a substantially homogeneous output. A continuous mixer which may be used is model ZPM-120 by Werner and Pfleiderer.

The time and temperature of baking are adjusted in accordance with conventional techniques to provide a moisture content in the soft baked products of 16% by weight or more, based upon the weight of the cookie, inclusive of fillers and inclusions such as flavor chips, raisins and fruit pieces. A fruit filled, soft, moist cookie produced in accordance with the present invention may generally have a moisture content (Brabender 145° C., 12 minutes) of less than about 26% by weight, preferably from about 18% to about 23% by weight, based upon the total weight of the cookie. Moisture contents may be determined by first grinding the cookies and then using conventional moisture analysis techniques on the ground sample. Exemplary of such techniques are Brabender (set at 145° C., for 12 minutes) analysis or vacuum oven (set at 70° C. for 24 hours) analysis, with appropriate correlation. The products exhibit a cookie crumb-like structure, appearance, and texture and structural integrity. Starch gelatinization (measured by differential scanning calorimetry) for the cookie products of the present invention is generally less than about 5%.

The water activity of the low fat or fat free baked goods of the present invention is preferably less than about 0.7, most preferably less than about 0.65, to assure microbial shelf stability. The doughs and/or fillers may include antimycotics or preservatives such as calcium propionate, potassium sorbate, sorbic acid and the like. Exemplary amounts may range up to about 1% by weight of the dough or filler to assure microbial shelf stability. While baking times and temperatures will vary for different dough formulations, oven types, etc., in general commercial cookie baking times may range from about 5 minutes to about 15 minutes and baking temperatures for cookies may range from about 250° F. (121° C.) to about 500° F. (260° C.).

The high-moisture, soft baked products of the present invention are preferably formed by cutting of the dough rope or extrudate after baking to avoid adhesion to dough cutting equipment. The cutting may be performed by a guillotine cutter, a band cutter, fluid jet cutter or the like.

The cookie dough compositions of the present invention may be used for the production of bar-type cookies, drop-type cookies, such as chocolate chip cookies, oatmeal cookies, sugar cookies, fruit cookies, and the like.

The present invention is further illustrated in the following examples where all parts, ratios, and percentages are by weight and all temperatures are in ° F., unless otherwise stated:

EXAMPLE 1

The ingredients and their relative amounts which may be used to prepare a fat-free fruit cookie having a shelf-stable soft, non-rubbery texture are:

| DOUGH INGREDIENTS | WEIGHT % |
|---|---|
| Stage 1 | |
| flour mix (about 10.5% by weight water) | 15.41 |
| sucrose | 7.40 |
| liquid sugar (about 68% sucrose, 32% water) | 9.86 |
| soy protein | 2.71 |
| flavorings | 1.11 |
| dried egg white | 2.16 |
| fine ground apple | 12.33 |
| ammonium bicarbonate | 0.09 |
| coloring | 0.18 |
| xanthan gum | 0.18 |
| sodium calcium alginate | 0.15 |
| Stage 2 | |
| calcium propionate | 0.12 |
| potassium sorbate | 0.12 |
| sodium bicarbonate | 0.37 |
| sodium aluminum phosphate | 0.31 |
| water | 8.63 |
| cake flour (wheat flour, about 12% water) | 9.86 |

-continued

| DOUGH INGREDIENTS | WEIGHT % |
|---|---|
| Stage 3 | |
| raisins (water soaked) | 9.25 |
| cherries | 3.70 |
| citrus peel | 1.85 |
| liquid sorbitol (about 66% solids, 34% water) | 14.18 |
| TOTAL | 100.0 |

The flour mix may contain about 40% by weight white rye flour, about 40% by weight corn flour, and about 20% by weight rice flour, said percentages adding up to 100%. The white rye flour may have a protein content of about 14.7% by weight, an insoluble fiber content of about 13% by weight, and a soluble fiber content of about 2% by weight. The corn flour may have a protein content of about 8.5% by weight, an insoluble fiber content of about 9.5% by weight, and a soluble fiber content of about 2.1% by weight. The rice flour may have a protein content of about 6.3% by weight, an insoluble fiber content of about 2.1% by weight, and a soluble fiber content of about 0% by weight. The flour mix may be prepared by separately grinding the flours, mixing them together, and then sifting the mixture to obtain a particle size distribution where the weight percentage passing through a 10 U.S. mesh, 18 U.S. mesh, and 30 U.S. mesh screen is zero, and about 60% by weight passes through a 60 U.S. mesh screen, and about 40% by weight remains on the 60 U.S. mesh screen.

The dough may be prepared at room temperature using a batch-type dough mixer running at low speed. The stage 1 ingredients may be placed in the mixer and mixed for about 5 minutes to obtain a smooth consistency. The stage 2 ingredients may then be added and the mixing continued for 1 minute on low speed and then 4 minutes on high speed. The stage 3 ingredients may then be added and the mixing continued for a further 5 minutes at low speed. The substantially homogeneous composition may be cooled to a temperature of about 68° F. to about 72° F. It may then be poured into a trough where it is permitted to lay for about 30 minutes to about 40 minutes. The finished dough may have a moisture content of about 26.2% by weight, inclusive of inclusions.

The dough may then be transferred to a calender press having counter rotating rollers to extrude the dough into a continuous rope. The dough rope may then be baked in a multi-zone band oven to an end point moisture content of about 21% by weight, based upon the weight of the cookie, inclusive of inclusions. The baked extrudate rope may be cut into pieces using a continuous band cutter and cooled at room temperature. The moisture content may be determined by grinding a sample of about 12 ounces of cookies into a homogeneous mixture and measuring the moisture content of the mixture on a Brabender moisture analyzer set at 145° C. for 12 minutes. The cookies may be stored in a closed container at room temperature until the moisture in the cookies equilibrates between the dough region and the fruit pieces to obtain a shelf-stable soft cookie where the dough portion possesses a cake-like soft and non-rubbery crumb matrix having a distinctly leavened appearance.

EXAMPLE 2

A fat free fruit bar may be prepared by coextruding an inner fat free apple filling with an outer or casing fat free cookie dough bakeable to a soft, non-rubbery cookie crumb texture through a concentric die into a coextrudate rope. The weight ratio of the inner fruit filling to the weight of the outer dough may be about 40:60. The ingredients and their relative amounts which may be used to prepare the fat free casing dough bakeable to a soft texture are:

| DOUGH INGREDIENTS | WEIGHT % |
|---|---|
| Stage 1 | |
| flour mix of Example 1 | 25.45 |
| sucrose | 10.18 |
| liquid sorbitol (about 66% solids, 34% water) | 18.83 |
| liquid sugar (about 68% sucrose, 32% water) | 11.20 |
| soy protein | 1.53 |
| flavorings | 1.12 |
| dried egg white | 0.20 |
| coloring | 0.10 |
| xanthan gum | 0.20 |
| sodium calcium alginate | 0.20 |
| invert sugar (about 72% solids) | 3.05 |
| sodium bicarbonate | 0.03 |
| calcium propionate | 0.20 |
| potassium sorbate | 0.20 |
| sodium aluminum phosphate | 0.03 |
| water | 7.12 |
| cake flour (wheat flour, about 12% water) | 13.23 |
| Stage 3 | |
| sucrose | 7.12 |
| TOTAL | 100.0 |

The dough may be prepared at room temperature using a batch-type dough mixer running at low speed. The stage 1 ingredients may be placed in the mixer and mixed for about 1 minute at low speed and about 5 minutes on high speed to obtain a smooth consistency. The stage 2 ingredients may then be added and the mixing continued for 3 minutes on low speed. The stage 3 ingredient may then be added and the mixing continued for a further 2 minutes at low speed. The substantially homogeneous composition may be cooled to a temperature of about 68° F. to about 72° F. It may then be poured into a trough where it is permitted to lay for about 30 minutes to about 40 minutes. The finished dough, which does not have inclusions, may have a moisture content of about 20% by weight.

The ingredients and their relative amounts which may be used to prepare the apple filling bakeable to a soft, moist texture are:

| FILLING INGREDIENTS | WEIGHT % |
|---|---|
| Stage 1 | |
| liquid sugar (about 68% sucrose, 32% water) | 11.39 |
| glycerine | 3.80 |
| corn syrup (about 77% by weight solids) | 5.70 |
| invert sugar (about 72% by weight solids) | 2.53 |
| pregelatinized corn starch | 1.90 |
| xanthan gum | 0.19 |
| preservatives | 0.70 |
| corn flour | 3.16 |
| flavorings | 1.90 |
| pectin | 0.38 |
| dextrose (Cerelose 2001) | 1.27 |
| rework from same product | 6.33 |
| Stage 2 | |
| ground apple | 28.48 |
| water | 10.13 |
| Stage 3 | |
| liquid sorbitol (about 66% solids, 34% water) | 22.15 |
| TOTAL | 100.0 |

The fat free apple filling may be prepared at room temperature using the same upright mixer and low mixing speed as used in preparing the fat free casing dough. The stage 1 ingredients may be placed in the mixer and mixed for about 5 minutes at low speed and then mixed about 10 minutes on high speed to obtain a smooth consistency. The stage 2 ingredients may then be added and the mixing continued for about 1 minute on low speed and about 5 minutes on high speed. The stage 3 ingredient may then be added and the mixing continued for a further 10 to 15 minutes at low speed. The substantially homogeneous composition may be cooled to a temperature of about 68° F. to about 72° F. It may then be poured into a trough where it is permitted to lay for about 30 minutes to about 40 minutes. The finished filling may have a moisture content of about 32% by weight.

The coextrudate rope prepared from the fat free casing dough and fat free filling may then be baked in a multi-zone band oven to an end point moisture content of about 20% by weight, based upon the weight of the cookie. The baked extrudate rope may be cut into pieces using a continuous band cutter and cooled at room temperature. The moisture content may be determined by grinding a sample of about 12 ounces of cookies into a homogeneous mixture and measuring the moisture content of the mixture on a Brabender moisture analyzer set at 145° C. for 12 minutes. The cookies may be stored in a closed container at room temperature until the moisture in the cookies equilibrates between the dough region and the fruit filling to obtain a shelf-stable soft cookie. The dough portion of the cookie may possess a cake-like soft and non-rubbery crumb matrix having a distinctly leavened appearance, while the fruit filling may possess a soft, moist texture.

EXAMPLE 3

A fat free fruit bar may be prepared as in Example 2 except the apple filling may be substituted with a fat free peach-apricot filling having a moisture content before baking of about 33% by weight. The final endpoint moisture content of the cookie may be about 21% by weight. The ingredients and their relative amounts which may be used to produce the fat free peach-apricot filling are:

| FILLING INGREDIENTS | WEIGHT % |
| --- | --- |
| Stage 1 | |
| liquid sorbitol (about 66% solids, 34% water) | 6.32 |
| glycerine | 2.85 |
| invert sugar (about 72% by weight solids) | 2.85 |
| corn syrup (about 77% by weight solids) | 8.54 |
| flavorings | 0.85 |
| coloring | 0.19 |
| rework from same product | 6.32 |
| pregelatinized cornstarch | 1.90 |
| xanthan gum | 0.28 |
| preservatives | 0.66 |
| corn flour | 4.74 |
| pectin | 0.63 |
| dextrose (cerelose 2001) | 1.26 |
| stage 2 | |
| ground peach | 18.97 |
| ground apricot | 17.07 |
| water | 9.48 |
| Stage 3 | |
| liquid sugar (about 68% sucrose, 32% water) | 17.07 |
| TOTAL | 100.0 |

What is claimed is:

1. A method for reducing rubberiness in the production of shelf-stable reduced fat fat free or low-fat cookies comprising reducing gluten functionality by replacing at least about 50% by weight of the wheat flour with a flour mix comprising at least about 30% by weight white rye flour, at least about 30% by weight corn flour, and at least about 10% by weight rice flour.

2. A method as claimed in claim 1 wherein the particle size distribution of the flour mix is about 55% by weight to about 65% by weight passes through a 60 mesh screen and none remains on a 30 mesh screen.

3. A method as claimed in claim 1 wherein the flour mix and wheat flour are admixed with sorbitol, and at least one sugar to form a dough, the dough is extruded, baked to a moisture content of at about 16% by weight, and then formed into pieces.

4. A method as claimed in claim 1 wherein the flour mix comprises about 35% by weight to about 50% by weight white rye flour, about 35% by weight to about 50% by weight corn flour, and about 15% by weight to about 25% by weight rice flour, said percentages adding up to 100%.

5. A method for the production of reduced fat low fat or no fat cookies comprising: a) admixing about 35% by weight to about 50% by weight white rye flour, about 35% by weight to about 50% by weight corn flour, and about 15% by weight to about 25% by weight rice flour, said percentages adding up to 100%, with wheat flour, at least one sugar, and at least one humectant to form a dough wherein the amount of wheat flour is from about 20% by weight to about 45% by weight of the total amount of flour, b) extruding the dough, and c) baking the dough to obtain cookies having a moisture content of at least about 16% by weight and a non-rubbery cookie crumb-like texture which is shelf-stable for at least about two months.

6. A method as claimed in claim 5 wherein said dough is coextruded with a fruit filler.

7. A method as claimed in claim 5 wherein said humectant comprises sorbitol.

8. A method as claimed in claim 7 wherein the amount of sorbitol is from about 25% by weight to about 55% by weight of the total amount of said at least one humectant and at least one sugar.

9. A method as claimed in claim 5 wherein said dough has a moisture content of from about 18% by weight to about 23% by weight, based upon the weight of the dough.

10. A method as claimed in claim 5 wherein the particle size distribution of the white rye flour, corn flour and rice flour is about 55% by weight to about 65% by weight passes through a 60 mesh screen and none remains on a 30 mesh screen.

11. A method as claimed in claim 5 wherein said cookie has a fat content of less than or equal to about two grams of fat per 30 gram serving.

12. A method as claimed in claim 5 wherein said cookie has a fat content of less than or equal to about 0.5 grams of fat per 30 gram serving.

13. A cookie dough composition for producing a reduced fat low fat or no fat cookie having a non-rubbery cookie crumb-like texture comprising: a) a mixture of flours comprising at least about 30% by weight white rye flour, at least about 30% by weight corn flour, and at least about 10% by weight rice flour, said mixture of flours comprising at least about 50% by weight of the total flour content of the dough, b) at least one humectant, and c) at least one sugar, said dough having a moisture content of less than about 30% by weight.

14. A cookie dough composition as claimed in claim 13 wherein the particle size distribution of the white rye flour, corn flour and rice flour is about 55% by weight to about 65% by weight passes through a 60 mesh screen and none remains on a 30 mesh screen.

15. A cookie dough composition as claimed in claim 14.wherein the total flour content of the dough is from about 30% by weight to about 50% by weight, based on the total weight of the dough.

16. A cookie dough composition as claimed in claim 15 wherein from about 20% by weight to about 45% by weight of the total amount of flour is wheat flour.

17. A cookie dough composition as claimed in claim 13 comprising about 35% by weight to about 50% by weight white rye flour, about 35% by weight to about 50% by weight corn flour, and about 15% by weight to about 25% by weight rice flour, said percentages adding up to 100%.

* * * * *